United States Patent
Bull et al.

(10) Patent No.: US 7,963,572 B2
(45) Date of Patent: Jun. 21, 2011

(54) DIFFERENTIAL PITCH HAMMERLESS CONNECTION WITH HYDRAULIC DRIVING MECHANISM

(75) Inventors: Brad Bull, Duncan, OK (US); Leonard Case, Duncan, OK (US); Todd Dean, Comanche, OK (US); Ivan Blanco, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 777 days.

(21) Appl. No.: 11/560,775

(22) Filed: Nov. 16, 2006

(65) Prior Publication Data

US 2008/0116688 A1   May 22, 2008

(51) Int. Cl.
*F16L 25/00* (2006.01)
(52) U.S. Cl. ........................................ 285/386; 285/354
(58) Field of Classification Search .................. 285/353, 285/354, 384, 386, 387, 388
See application file for complete search history.

(56) References Cited

U.S. PATENT DOCUMENTS

| 405,745 | A | | 6/1889 | Ross |
|---|---|---|---|---|
| 509,742 | A | | 11/1893 | Lane |
| 861,828 | A | | 7/1907 | Grindrod et al. |
| 883,080 | A | * | 3/1908 | Bullock ........................ 285/329 |
| 883,122 | A | * | 3/1908 | Steneck ........................ 285/329 |
| 1,820,656 | A | | 8/1931 | Ford |
| 2,112,352 | A | | 3/1938 | Vetrano |
| 2,318,112 | A | | 5/1943 | Stillwagon |
| 4,801,051 | A | | 1/1989 | Lewis et al. |
| 6,254,147 | B1 | | 7/2001 | Edwards |
| 6,357,927 | B1 | * | 3/2002 | Myers et al. .................. 384/563 |
| 6,945,569 | B1 | | 9/2005 | Diaz et al. |
| 7,350,832 | B1 | * | 4/2008 | Kiely ............................ 285/354 |
| 2007/0125541 | A1 | | 6/2007 | Bull et al. |

FOREIGN PATENT DOCUMENTS

WO   2007063273 A1   6/2007

OTHER PUBLICATIONS

Foreign communication from a related counterpart application—International Search Report and Written Opinion, PCT/GB2006/004125, Feb. 12, 2007, 11 pages.
Office Action dated Sep. 15, 2008 (14 pages), U.S. Appl. No. 11/292,981, filed Dec. 2, 2005.
Office Action (Final) dated Sep. 4, 2009 (19 pages), U.S. Appl. No. 11/292,981, filed Dec. 2, 2005.
Weco Wing Union Figure 1502, FMC Technologies, http://www.fmctechnologies.com/FluidControl/Flowline/WingUnions/StandardService/Figure1502.aspx; printed Aug. 25, 2005; 1 pg.

* cited by examiner

*Primary Examiner* — Aaron Dunwoody
(74) *Attorney, Agent, or Firm* — John W. Wustenberg; Conley Rose, P.C.

(57) ABSTRACT

A threaded connection assembly comprises a nut, a multiplier connected to the nut via a first threaded interface having a first number of threads per inch and a well servicing pipe coupling connected to the multiplier via a second threaded interface having a second number of threads per inch. A method of forming a threaded connection for a well servicing application comprises forming a pipe coupling between two well servicing pipe sections and threading a connector to the pipe coupling to form a threaded connection without impact loading the connector. Another method for forming a threaded connection comprises disposing a first pipe section partially within a nut, threading a multiplier into the nut, threading the multiplier onto a second pipe section, and leveraging the multiplier against the nut, or vice versa.

12 Claims, 19 Drawing Sheets

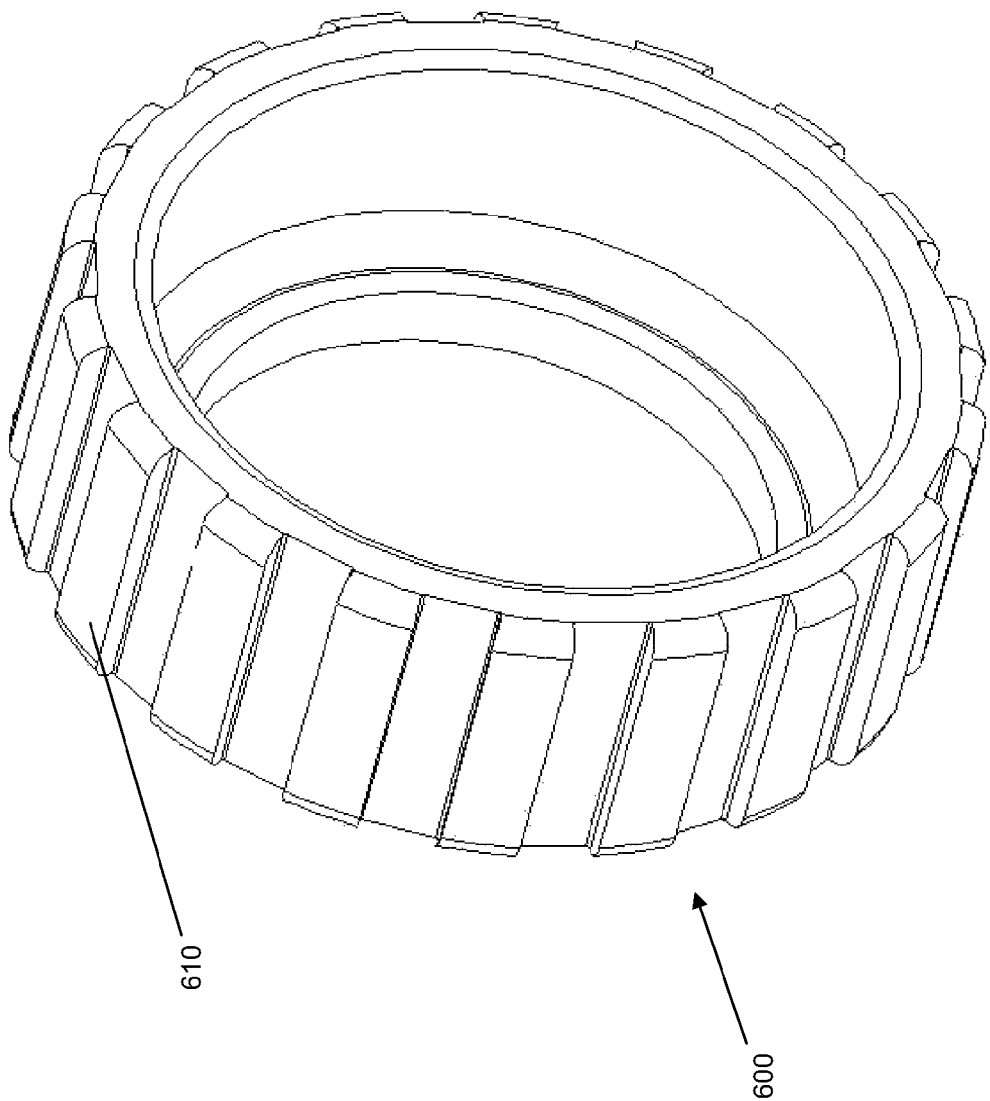

DIFFERENTIAL PITCH HAMMERLESS CONNECTION WITH HYDRAULIC DRIVING MECHANISM

CROSS-REFERENCE TO RELATED APPLICATIONS

The present application is related to U.S. patent application Ser. No. 11/292,981 filed Dec. 2, 2005 and entitled "Threaded Connector for Well Servicing Applications," which is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to threaded connectors comprising differential thread pitches, and methods of making up a pipe connection via such threaded connectors. More particularly, the present invention relates to threaded connectors for well servicing applications and methods of connecting two pipe sections together by leveraging one component of a threaded connector against another.

BACKGROUND

Threaded connectors, such as a union comprising an internally threaded nut, for example, may be used to provide a preloaded threaded connection between two sections of pipe in a well servicing application. Such threaded connectors are commonly used for high pressure manifolding connections in well servicing applications, such as fracturing, stimulating, and cementing operations. Typically, the equipment, such as pumps, blenders, and threaded connectors, for example, that is required to rig up a manifolding network to a wellhead is transported to the wellsite. As the manifolding network is connected to the wellhead, two pipe sections may be coupled and a union with internal threads and external wings or lugs may be used to form a threaded connection with the two pipe sections by impact loading. First, a pin-end pipe section extends into a box-end pipe section with a face seal provided between them. Then the union is installed over the coupled pipe sections by internal threads on the union engaging external threads on one or both of the pipe sections to form the threaded connection. Finally, the threaded connection is preloaded to prevent the face seal from extruding under pressure. To preload the threaded connection, a sledge hammer is typically used to apply force to the radially extending lugs on the union, thereby rotating the union and tightening the threaded connection until a desired amount of preload force is achieved.

A significant amount of preload force may be required to maintain the face seal when under pressure. Hence, the impact load necessary to make up the threaded connection can be significant, requiring repeated blows of a sledge hammer that may weigh approximately 6 to 8 pounds, for example. Such impact loading may lead to various types of physical injuries, including stress-related injuries, to the personnel who make up these connections, especially in extremely cold or extremely hot environments.

Thus, a need exists for alternative apparatus and methods to make up threaded connections in well servicing applications without impact loading. The ability to make up threaded connections without impact loading may remove hazards associated with swinging hammers, trip hazards due to hydraulic and pneumatic lines and power tools, and flying debris from impact on traditional connections. Due to the significant preload force required in such threaded connections, the alternative apparatus and methods must be capable of applying the requisite preload force to maintain a positive face seal between two pipe sections when that threaded connection is under pressure.

SUMMARY OF THE INVENTION

In one aspect, the present disclosure relates to a threaded connection assembly comprising a nut, a multiplier connected to the nut via a first threaded interface having a first number of threads per inch (first TPI), and a well servicing pipe coupling connected to the multiplier via a second threaded interface having a second number of threads per inch (second TPI). The first threaded interface and the second threaded interface may be at least partially formed simultaneously. In an embodiment, the first TPI is less than the second TPI. The threaded connection assembly may further comprise a negative equivalent TPI between the nut and the well servicing pipe coupling. In an embodiment, the nut connects to the well servicing pipe coupling via a non-threaded connection. The well servicing pipe coupling may comprise a pin-end pipe section disposed partially within a box-end pipe section with a face seal provided there between. The nut and the multiplier may rotate in opposite directions to form the second threaded interface. The threaded connection assembly may further comprise a torque tool that simultaneously imparts a rotational force to the nut and an opposite rotational force to the multiplier. In various embodiments, the torque tool simultaneously engages a hole in the nut and a hole in the multiplier, or a spline on the nut and a hole in the multiplier, or vice versa, or a spline on the nut and a spline on the multiplier, or a channel on the nut and a crenel-like space on the multiplier. The torque tool may comprise a mechanical tool, a hydraulic tool, a pneumatic tool, an electrical tool, or a combination thereof.

In another aspect, the present disclosure relates to a method of forming a threaded connection for a well servicing application comprising forming a pipe coupling between two well servicing pipe sections, and threading a connector to the pipe coupling to form a threaded connection without impact loading the connector. The well servicing application may comprise fracturing, stimulating or cementing. The method may further comprise preloading the threaded connection without impact loading the connector, and performing the well servicing application, wherein the preloading prevents a seal in the pipe coupling from extruding during the well servicing application. In an embodiment, threading the connector to the pipe coupling comprises leveraging a portion of the connector against another portion of the connector. In an embodiment, preloading the threaded connection comprises imparting a rotational force to a first portion of the connector and simultaneously imparting an opposite rotational force to a second portion of the connector.

In yet another aspect, the present disclosure relates to a method of forming a threaded connection for a well servicing application comprising disposing a first pipe section partially within a nut, threading a multiplier into the nut, threading the multiplier onto a second pipe section, and leveraging the multiplier against the nut, or vice versa. The method may further comprise attaching the nut to the first pipe section via a non-threaded connection. In an embodiment, the method further comprises simultaneously imparting opposite rotational forces to the multiplier and the nut to tighten the threaded connection. The rotational forces may be imparted mechanically, hydraulically, pneumatically, electrically, or a combination thereof. The method may further comprise providing a face seal between the first pipe section and the second pipe section, tightening the threaded connection to provide a sufficient preload to prevent the face seal from extruding during the well servicing application, and performing the well servicing application.

In still another aspect, the present disclosure relates to a torque tool comprising a first engaging portion that engages a first component of a connector, a second engaging portion that engages a second component of the connector, and a threaded shaft extending between the first engaging portion and the second engaging portion, wherein rotation of the threaded shaft simultaneously imparts opposite rotational forces to the first component and the second component of the connector. In an embodiment, the first engaging portion and the second engaging portion are disposed at a 90 degree angle. The torque tool may further comprise a load-bearing shaft extending between the first engaging portion and the second engaging portion. In various embodiments, the first engaging portion engages a hole or a spline in the first component of the connector, and the second engaging portion engages a hole or a spline in the second component of the connector.

In another embodiment, the torque tool comprises a hydraulic cylinder torque tool comprising a first engaging portion that engages a first component of a connector, a second engaging portion that engages a second component of the connector, and a flexible force distributing component extending from the first engaging portion and past the second engaging portion through the body of the hydraulic cylinder torque tool, wherein extension of the hydraulic cylinder torque tool's piston simultaneously imparts opposite rotational forces to the first component and the second component of the connector. In various embodiments the engaging portions of the hydraulic cylinder torque tool engage slots, channels, bores, or crenel-like spaces of the connector components.

BRIEF DESCRIPTION OF THE DRAWINGS

For a more detailed description of the present invention, reference will now be made to the accompanying drawings, wherein:

FIG. 6 is a side perspective view of another embodiment of one component of a threaded connector comprising a spline nut.

NOTATION AND NOMENCLATURE

Figure 1:
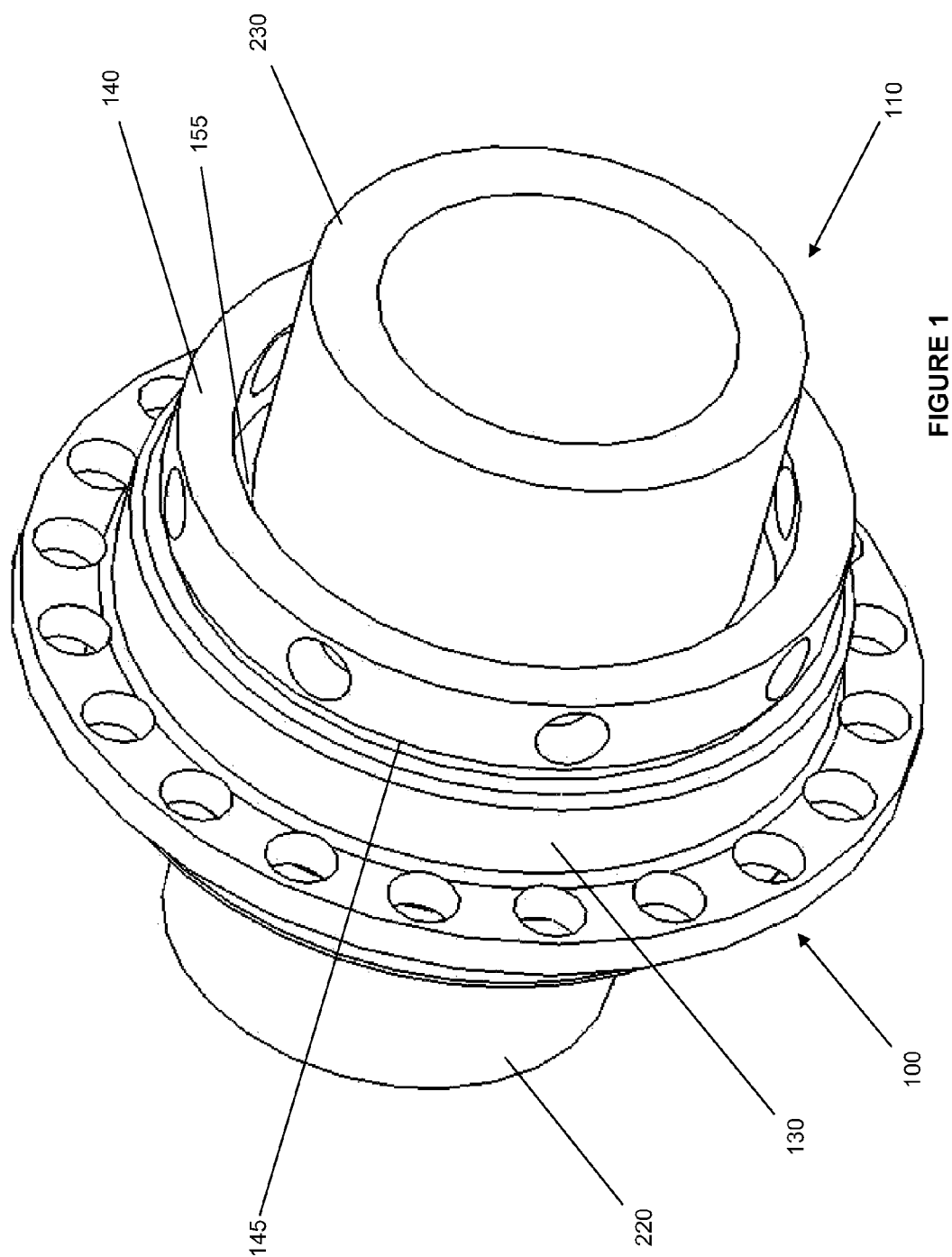
FIG. 1 is a front perspective view of one representative threaded connector engaging two pipe section components to form a threaded connection.

Certain terms are used throughout the following description and claims to refer to particular components. This document does not intend to distinguish between components that differ in name but not function. In the following discussion and in the claims, the terms "including" and "comprising" are used in an open-ended fashion, and thus should be interpreted to mean "including, but not limited to . . . ".

DETAILED DESCRIPTION

Various embodiments of threaded connectors for use in well servicing applications will now be described with reference to the accompanying drawings, wherein like reference numerals are used for like features throughout the several views. There are shown in the drawings, and herein will be described in detail, specific embodiments of threaded connectors operable to connect two pipe sections together without the application of an impact load, with the understanding that this disclosure is representative only and is not intended to limit the invention to those embodiments illustrated and described herein. The embodiments of the threaded connectors and the methods disclosed herein may be used in any type of well servicing application where it is desired to connect two pipe sections together. It is to be fully recognized that the different teachings of the embodiments disclosed herein may be employed separately or in any suitable combination to produce desired results.

FIG. 1 depicts one representative threaded connector 100 comprising two separable components, namely a nut 130 and a multiplier 140, used to form a threaded connection 110 with a pin-end pipe section 220 engaging and coupled to a box-end pipe section 230. The threaded connection 110 comprises a first threaded interface 155 between the multiplier 140 and the box-end pipe section 230, and a second threaded interface 145 between the multiplier 140 and the nut 130. The threaded interfaces 155, 145 will be referred to herein as the multiplier-box threads 155 and the nut-multiplier threads 145. As will be described in more detail below, the number of threads per inch (TPI) at the nut-multiplier threads 145 is different than the TPI at the multiplier-box threads 155. TPI equals the inverse of the thread pitch (i.e. TPI=1/thread pitch). Hence, a larger or courser thread pitch corresponds to a smaller TPI, and likewise, a smaller or finer thread pitch corresponds to a larger TPI.

Figure 2:
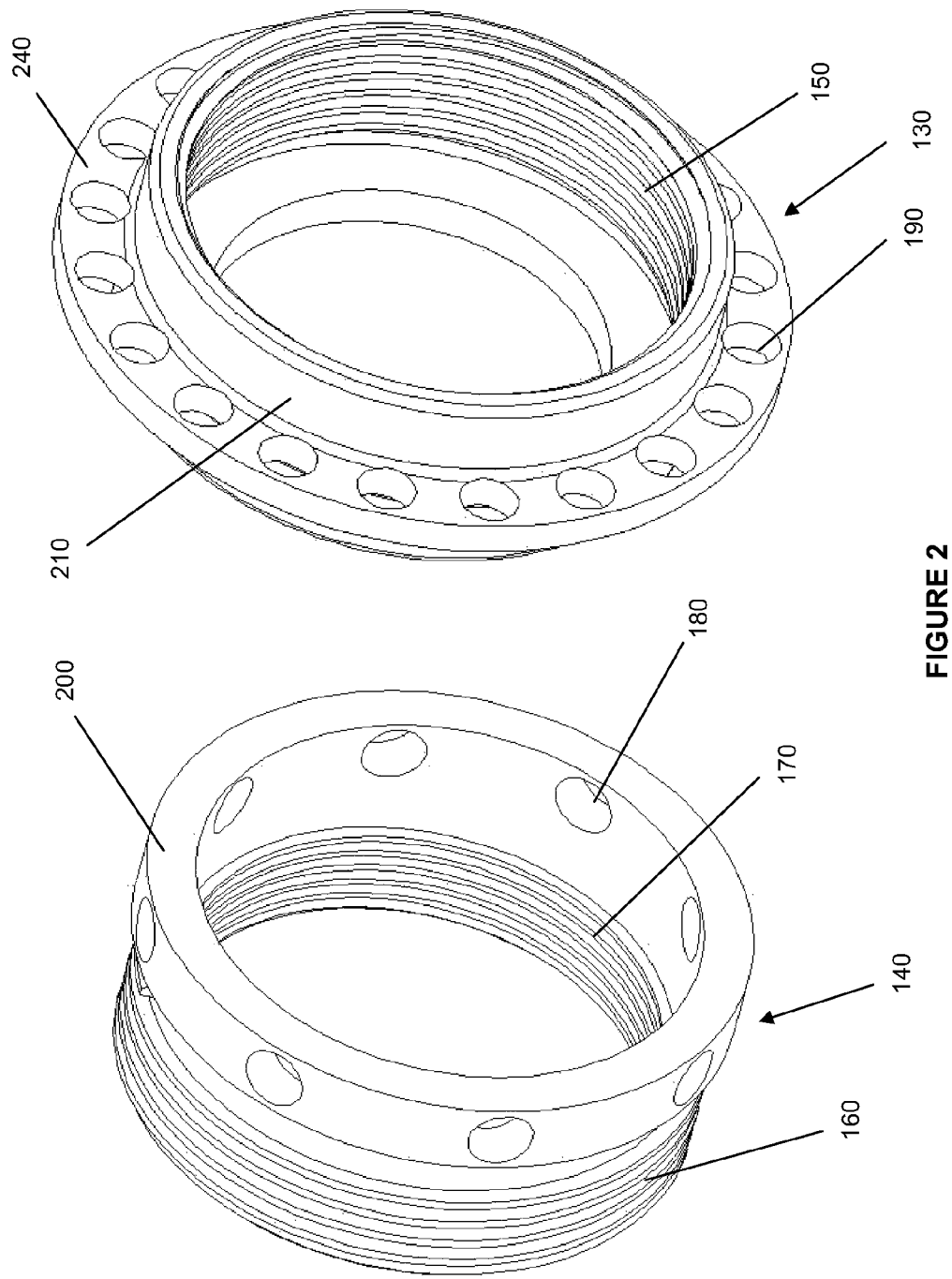
FIG. 2 is a front perspective view of two separated portions of the threaded connector depicted in FIG. 1, the two portions comprising a multiplier and a nut.

FIG. 2 depicts the separated individual components of the threaded connector 100 of FIG. 1, namely the multiplier 140 and the nut 130. In one embodiment, the multiplier 140 comprises a cylindrical body 200 with an inner thread set 170 and an outer thread set 160 at one end. At the opposing end of the multiplier 140, circular holes 180 are provided that extend through the cylindrical body 200 and are spaced circumferentially about the cylindrical body 200. In one embodiment, the nut 130 comprises a cylindrical body 210 with a flange 240. Circular bores 190 extend through the flange 240 and are spaced circumferentially about the flange 240. An inner set of threads 150 is located along the inner diameter of the cylindrical body 210 near the flange 240. When the threaded connection 110 is made up, the inner multiplier threads 170 engage similar outer threads on the box-end pipe section 230 to form the multiplier-box threads 155, and the inner nut threads 150 engage the outer multiplier threads 160 to form the nut-multiplier threads 145.

Referring again to FIG. 1, the threaded connection 110 comprises two threaded interfaces, the nut-multiplier threads 145 and the multiplier-box threads 155. The threaded connector 100 is designed such that the number of threads per inch, and therefore, the thread pitch, at the nut-multiplier threads 145 is different than the number of threads per inch, and therefore, the thread pitch at the multiplier-box threads 155. When larger or courser thread pitches, corresponding to smaller TPIs, are provided at the nut-multiplier threads 145 and the multiplier-box threads 155, a fine equivalent TPI is provided between the nut 130 and the box-end pipe section 230 according to the following equation:

$$TPI_{EQ}=(TPI_{nut\text{-}multiplier} \times TPI_{multiplier\text{-}box})/(TPI_{nut\text{-}multiplier}-TPI_{multiplier\text{-}box})$$

where:
$TPI_{EQ}$ is the equivalent number of threads per inch between the nut 130 and the box-end pipe section 230,
$TPI_{nut\text{-}multiplier}$ is the number of threads per inch at the nut-multiplier threads 145, and
$TPI_{multiplier\text{-}box}$ is the number of threads per inch at the multiplier-box threads 155.

One advantage of this fine equivalent TPI is that less torque must be applied to the threaded connection 110 to reach a desired preload during make up.

In one embodiment, the threaded connector 100 is designed such that the number of threads per inch at the nut-multiplier threads 145 ($TPI_{nut\text{-}multiplier}$) is less than the number of threads per inch at the multiplier-box threads 155 ($TPI_{multiplier\text{-}box}$), which results in a negative equivalent number of threads per inch ($-TPI_{EQ}$) between the nut 130 and the box-end pipe section 230 per the above equation. For example, where $TPI_{nut\text{-}multiplier}=3$ and $TPI_{multiplier\text{-}box}=4$, the $TPI_{EQ}=-12$. This negative $-TPI_{EQ}$ enables the multiplier 140 to thread into the nut 130 in a rotational direction opposite the direction the multiplier 140 rotates when threading onto the box-end pipe section 230. Specifically, after the multiplier 140 has been partially threaded onto the box-end pipe section 230 via the multiplier-box threads 155, the multiplier 140 may then be threaded into the nut 130 by rotating the multiplier 140 in the opposite direction. Thus, the multiplier 140 actually begins threading off of the box-end pipe section 230 as it threads onto the nut 130 at a faster rate to tighten the connection. This design is functionally advantageous for several reasons. First, the multiplier 140 threads into, not out of, the nut 130 as the threaded connection 110 is tightened. Second, the threaded connection 110 is made up by leveraging the nut 130 against the multiplier 140. Such leveraging eliminates the need for impact loading or for leverage from another source besides the threaded connector 100 components 130, 140 during make up of the threaded connection 110.

In another embodiment, the $TPI_{EQ}$ between the nut 130 and the box-end pipe section 230 may be positive. Per the above equation, a positive equivalent number of threads per inch ($+TPI_{EQ}$) between the nut 130 and the box-end pipe section 230 would result if the number of threads per inch at the nut-multiplier threads 145 ($TPI_{nut\text{-}multiplier}$) were greater than the number of threads per inch at the multiplier-box threads 155 ($TPI_{multiplier\text{-}box}$). Then, the multiplier 140 would have to rotate in the same direction to thread into the nut 130 and to thread onto the box-end pipe section 230. This would prevent the nut 130 from providing leverage for the multiplier 140 when tightening the threaded connection 110. Thus, leverage for this tightening process would have to be provided by another source besides the threaded connector 100 components 130, 140, or the threaded connection 110 would have to be made up by another method.

Figure 3A:
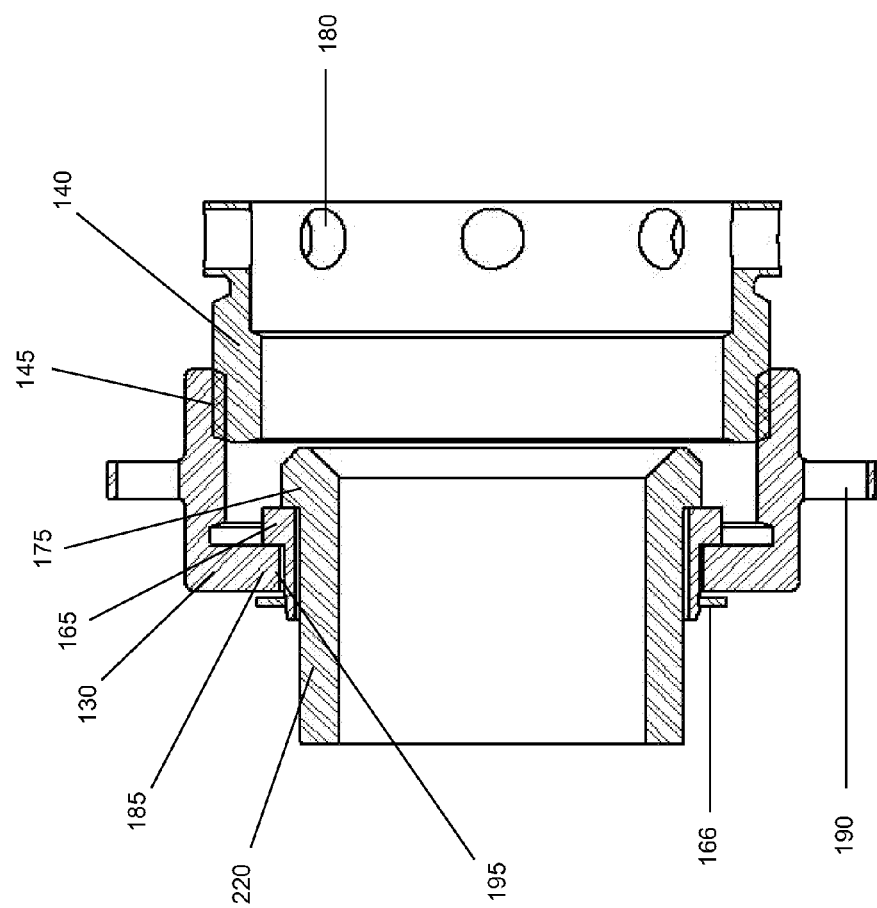
FIGS. 3A to 3C are sequential cross-sectional side views of one embodiment of a make up sequence for the threaded connection depicted in FIG. 1.
Figure 3B:
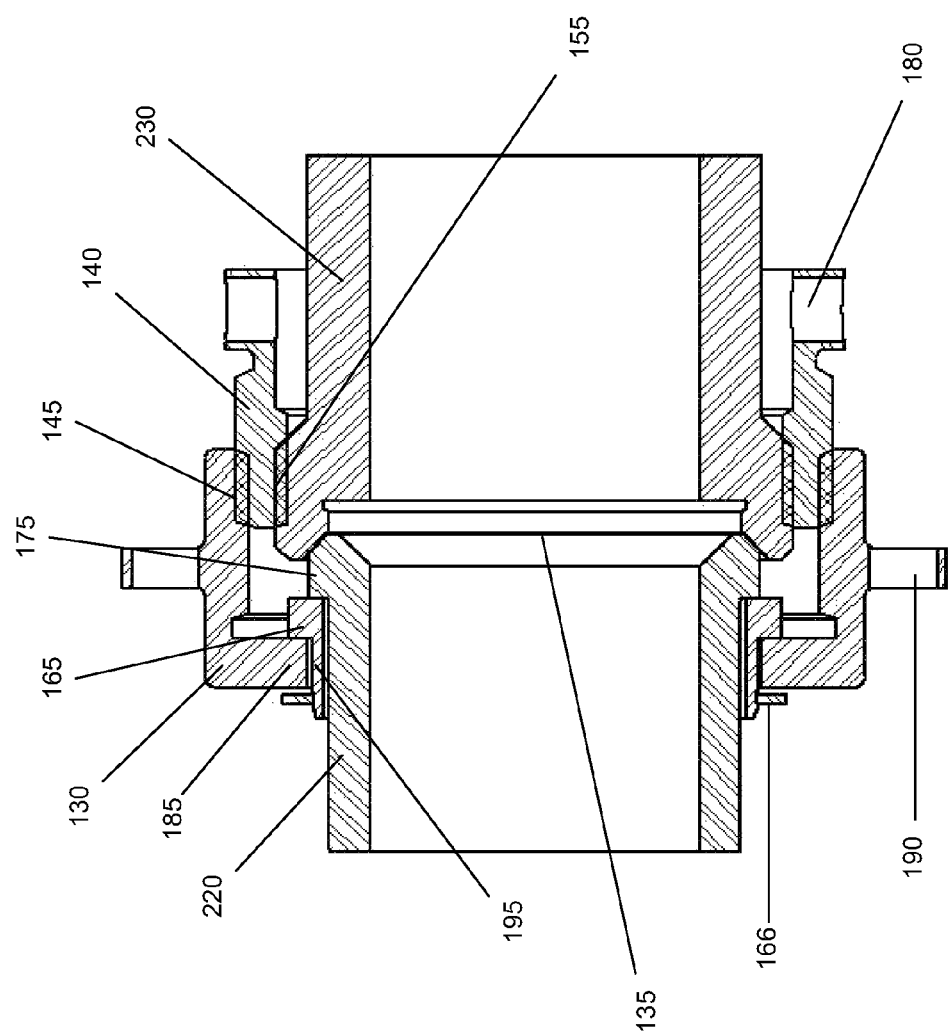
Figure 3C:
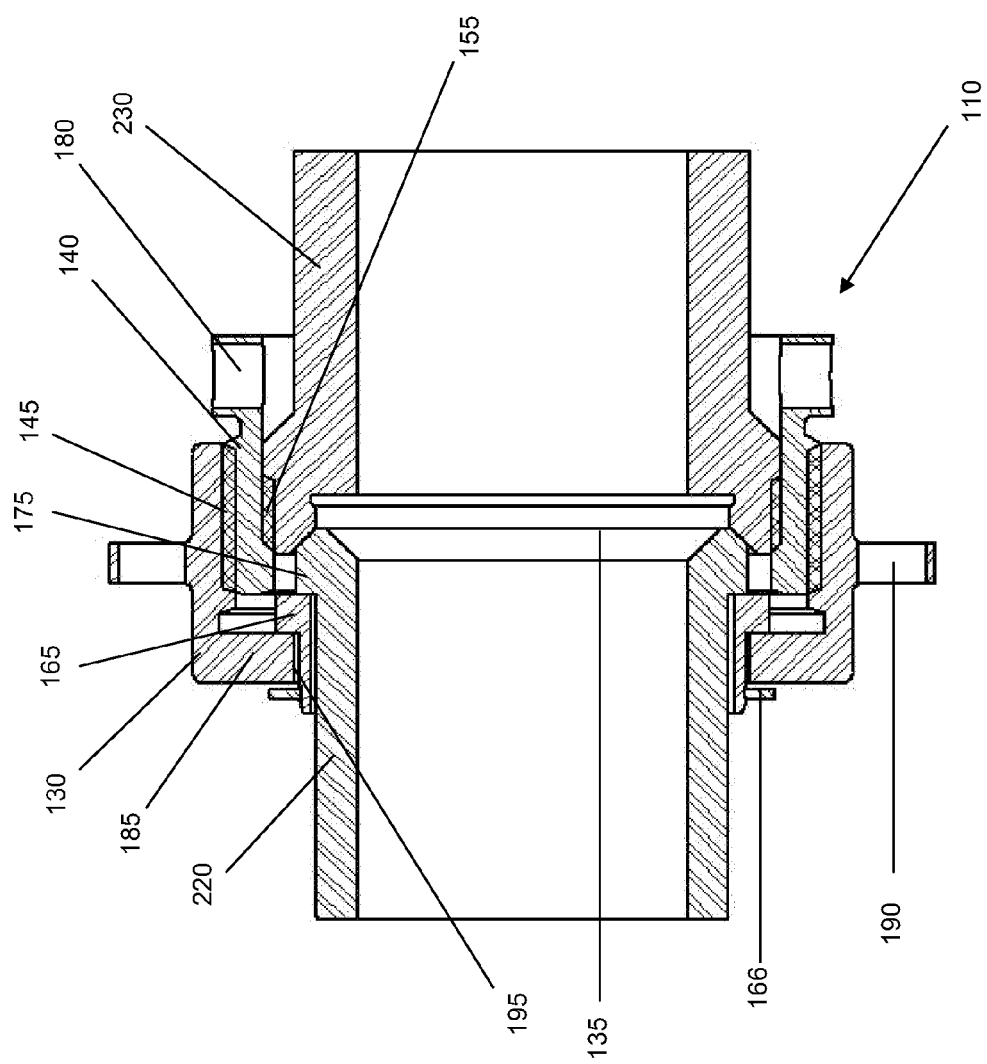

FIGS. 3A through 3C depict one embodiment of a make up sequence for a threaded connection 110 comprising a threaded connector 100 with a negative equivalent number of threads per inch ($-TPI_{EQ}$) between the nut 130 and the box-end pipe section 230. As shown in FIG. 3A, the pin-end pipe section 220 connects to the nut 130 via dogs 165 and a retaining ring 166, and the multiplier 140 connects to the nut 130 via the nut-multiplier threads 145. To make up the threaded connection 110, the nut 130 slides over the pin-end pipe section 220 and the dogs 165 are positioned to engage a shoulder 175 on the pin-end pipe section 220. An annular ring portion 185 of the nut 130 engages an annular recess 195 formed into the dogs 165. In one embodiment, the dogs 165 comprise a plurality of partial circular segments that fit together to form a complete circle. Then a retaining ring 166 is installed that surrounds the dogs 165 to hold them together in position about the pin-end pipe section 220. Next, the multiplier 140 is hand threaded into the nut 130 while the nut 130 is held in place, leaving some room for further engagement, as depicted in FIG. 3A. As the multiplier 140 is threaded into the nut 130 via the nut-multiplier threads 145, the nut 130 is prevented from moving axially, but not rotationally, via the retaining ring 166 and the dogs 165 engaging the shoulder 175 of the pin-end pipe section 220. In particular, the nut 130 is constrained from moving axially by the engagement of the annular ring portion 185 of the nut 130 within the annular recess 195 of the dogs 165 and the retaining ring 166. The multiplier 140 may also be prevented from moving rotationally by configuring the multiplier 140 to accept friction increasing components, e.g. set screws, to apply anti-rotational frictional forces to the box-end pipe section 230.

Referring now to FIG. 3B, the multiplier 140 is then threaded onto the box-end pipe section 230 via multiplier-box threads 155 until hand-tight. At this point, the box-end pipe section 230 receives and engages the pin-end pipe section 220 with a seal 135 provided there between. In particular, a rubber compound with a lip fits into a groove located at the end of the box-end pipe section 230. When the pipe sections 220, 230 connect, the rubber compound engages the pin-end pipe section 220 to form a face seal 135 where the pipe sections 220, 230 engage. During this step, the nut 130 does not move relative to the multiplier 140 at the threads 145.

In the final step of make up, as depicted in FIG. 3C, the multiplier 140 is further threaded into the nut 130. Next, a torque tool may be inserted into the threaded connector 100 to further tighten the threaded connection 110 until a desired level of preload is applied. In particular, the threaded connection 110 must be preloaded to prevent the face seal 135 from extruding when the threaded connection 110 is placed under operating pressure during well servicing applications. When the threaded connection 110 is properly preloaded, the seal 135 is compressed, as shown in FIG. 3C, until metal-to-metal contact is achieved between the box-end pipe section 230 and the pin-end pipe section 220, which thereby prevents the face seal 135 from extruding under pressure. If the threaded connection 110 is not properly preloaded, application of fluid pressure within the threaded connection 110 could cause a loss of the face seal 135. As tightening of the threaded connection 110 progresses, the multiplier 140 is threaded onto the box-end pipe section 230 via multiplier-box threads 145 while at the same time, the nut 130 is threaded onto the multiplier 140 via nut-multiplier threads 155. Contact of the dogs 165 with the shoulder 175 of the pin-end pipe section 220 permits the nut 130 to provide leverage to the multiplier 140 during this tightening procedure.

Thus, the threaded connection 110 shown in FIG. 1 and FIG. 3C can be made up without applying an impact load to the threaded connector 100, in contrast to the traditional method of making connections using a union-type connector. Instead, the threaded connection 110 can be made up by applying an opposite rotational force to the multiplier 140 and the nut 130, simultaneously.

Figure 4A:
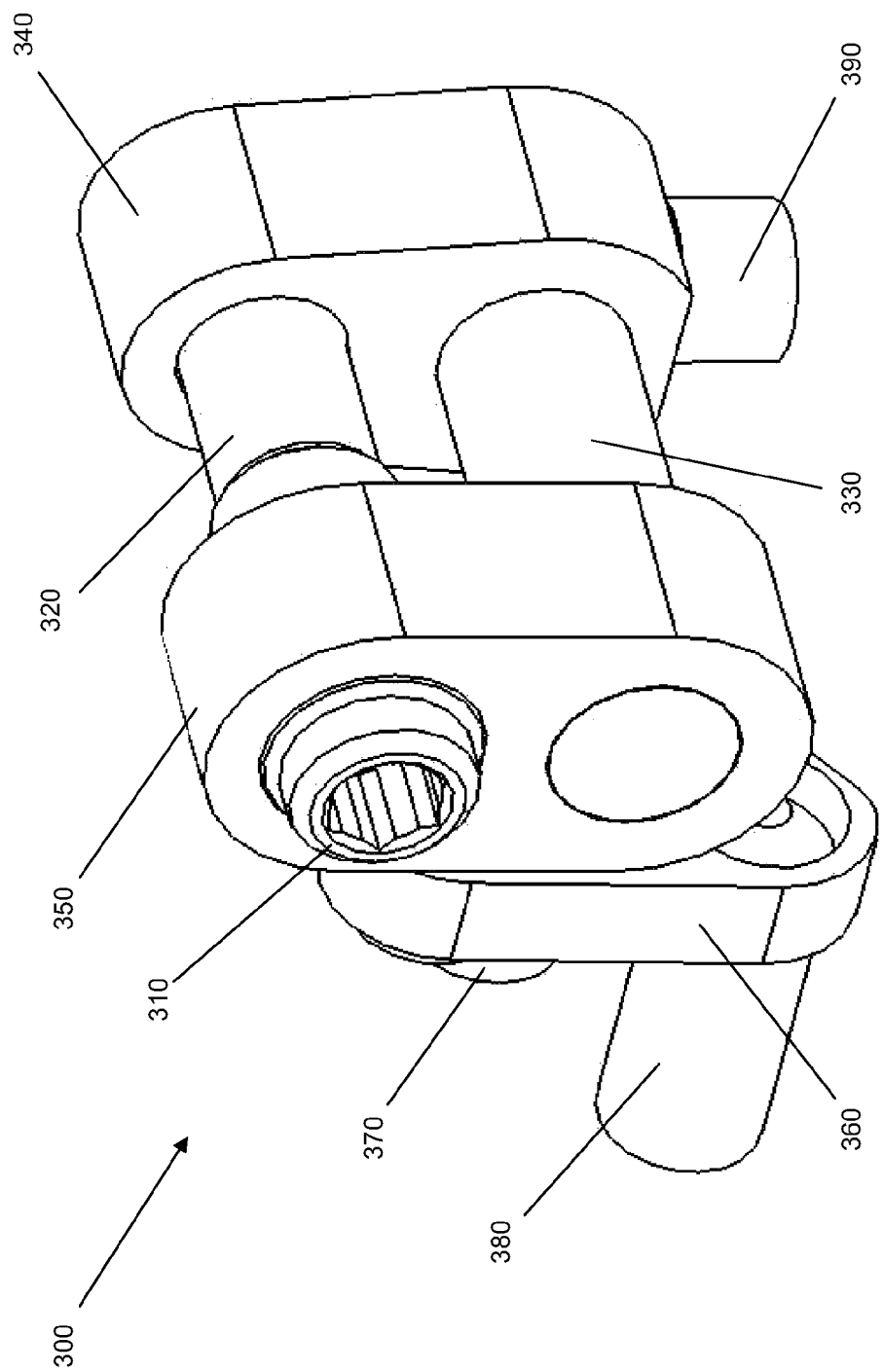
FIGS. 4A and 4B are front and back perspective views, respectively, of one embodiment of a torque tool that may be used to make up the threaded connection depicted in FIG. 1.
Figure 4B:
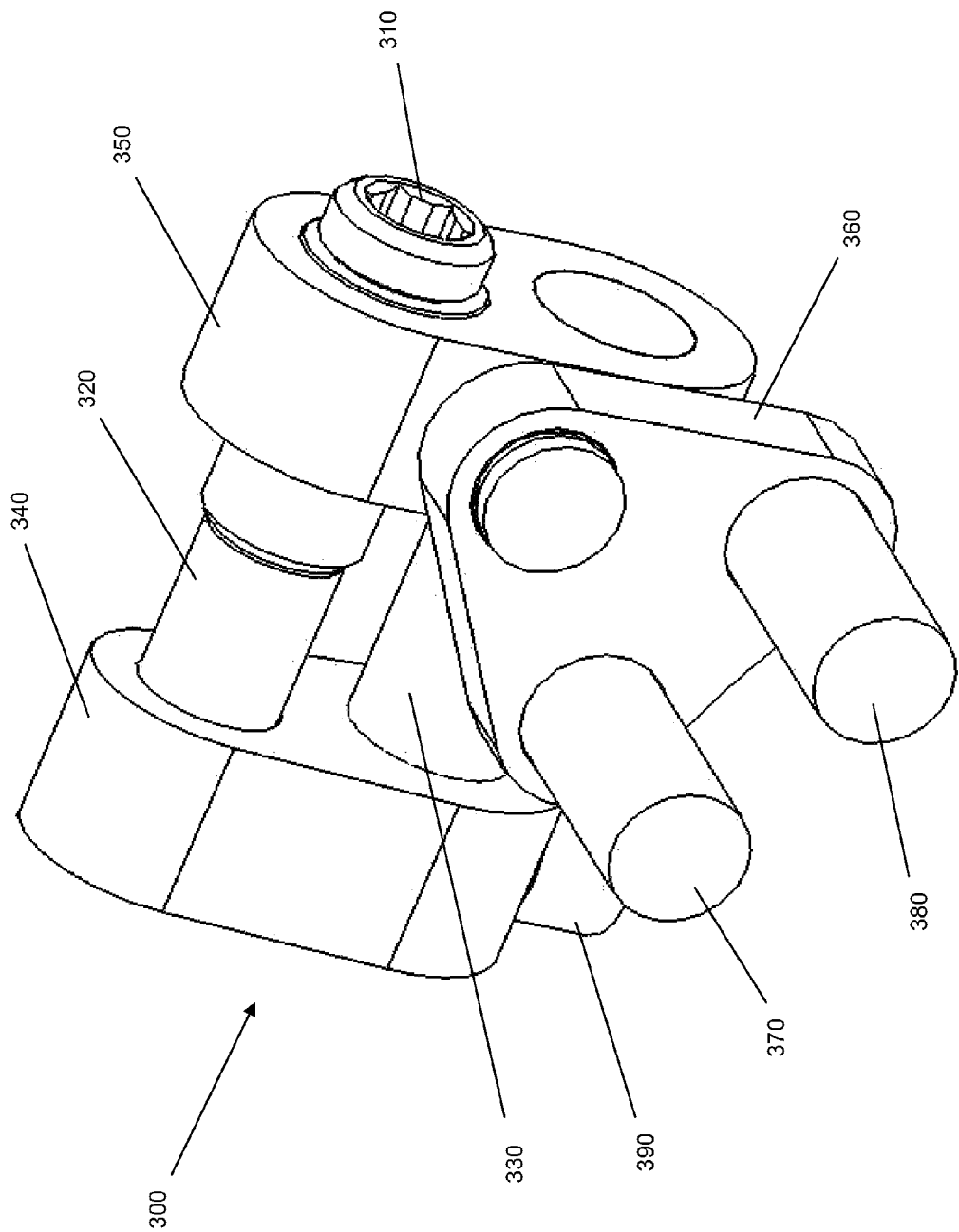

FIG. 4A and FIG. 4B depict a front and back perspective view, respectively, of one representative torque tool 300 that may be used to make up a threaded connection 110 having a negative $TPI_{EQ}$ between the nut 130 and the box-end pipe section 230. Referring first to FIG. 4A, the torque tool 300 comprises a first support 340, a second support 350, and a third support 360; a threaded shaft 320 extending between the first support 340 and the second support 350; a load-bearing shaft 330 extending between the first support 340 and the second support 350; a multiplier-engaging pin 390 extending downwardly from the first support 340 to insert into the a hole 180 of the multiplier 140; and, as best depicted in FIG. 4B, two nut-engaging pins 370, 380, extending laterally from the third support 360 to insert into bores 190 of the nut 130. The threaded shaft 320 is locked to the second support 350 such that the threaded shaft 320 is rotatable but not slideable relative to the second support 350. A hex 310 is located at one end of the threaded shaft 320 closest to the second support 350, and at the opposite end the threaded shaft 320 is threaded into the first support 340.

Figure 5A:
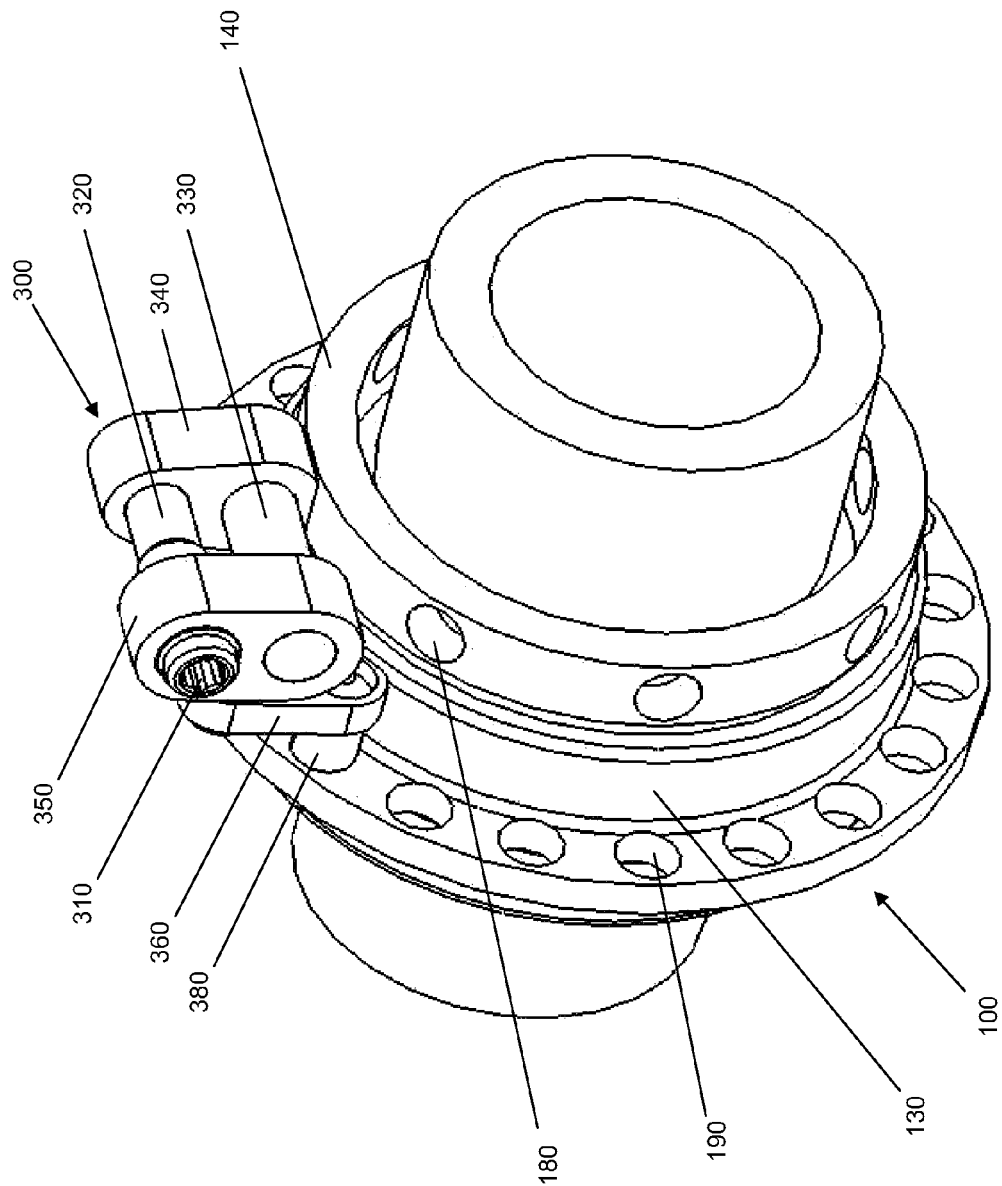
FIGS. 5A and 5B are front and back perspective views, respectively, of the tool depicted in FIGS. 4A and 4B used to make up the threaded connection of FIG. 1.
Figure 5B:
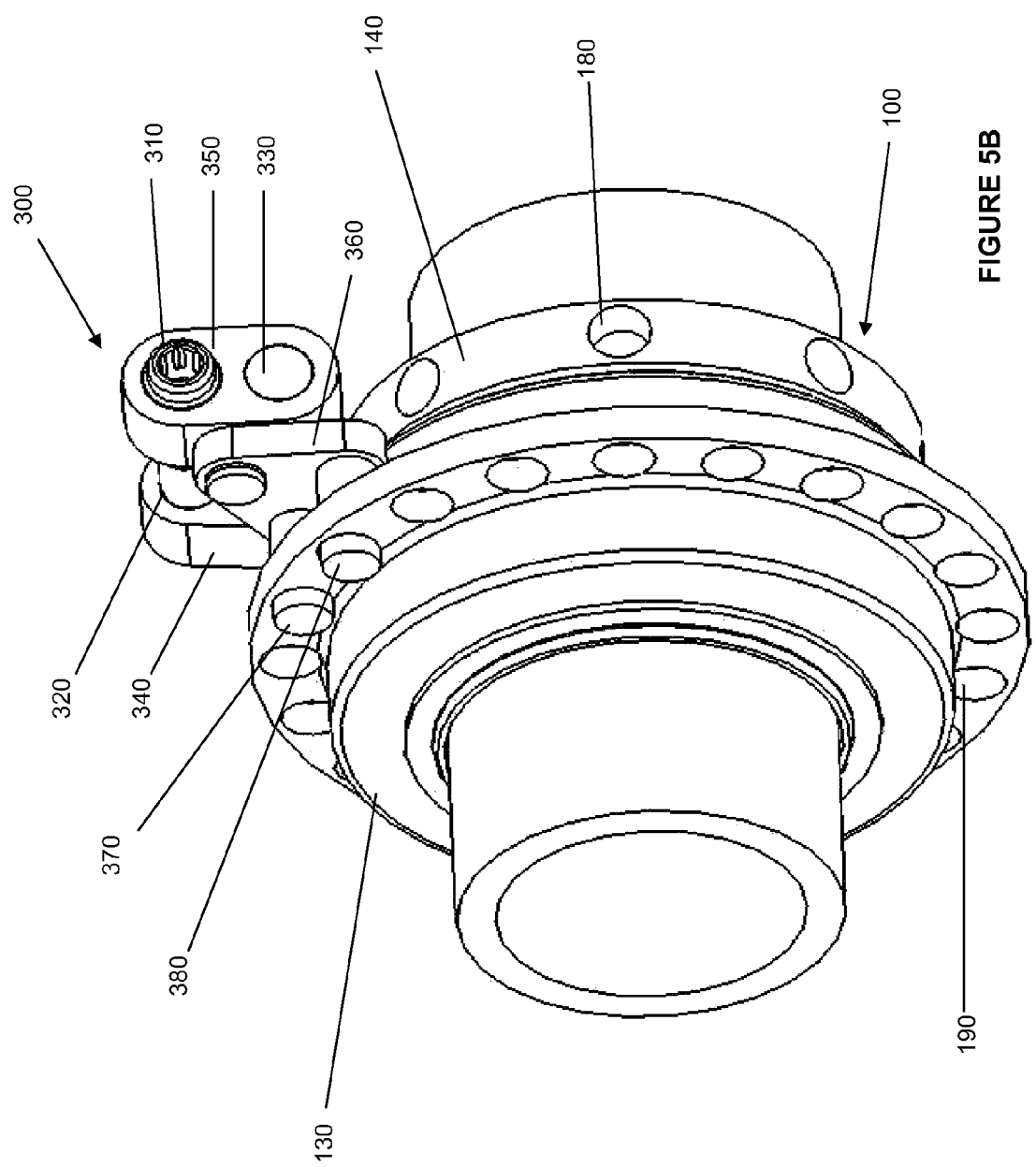

During the final stage of make up of the threaded connection 110, the torque tool 300 is inserted into the threaded connector 100 by inserting the multiplier-engaging pin 390 into one of the holes 180 in the multiplier 140 and the nut-engaging pins 370, 380 into two adjacent bores 190 in the nut 130, as shown in perspective front and back views in FIG. 5A and FIG. 5B, respectively. The multiplier-engaging pin 390 is not visible in FIG. 5A or FIG. 5B since it has been inserted into a hole 180 of the multiplier 140. However, as best shown in FIG. 5B, the nut-engaging pins 370, 380 extend through two adjacent bores 190 of the nut 130.

A socket wrench, torque wrench, drill or similar tool may then be inserted into the hex 310 of the torque tool 300 to apply a rotational force to the threaded shaft 320, thereby causing it to rotate or thread out of the first support 340. As the threaded shaft 320 threads out of the first support 340, it acts to push the first support 340 away from the second support 350. Further, because the threaded shaft 320 is not slideable relative to the second support 350, and the second support 350 is fixed relative to the third support 360, rotation of the threaded shaft 320 also pushes the first support 340 and the third support 360 apart. This action causes the nut 130 and the multiplier 140 to rotate in opposite directions, thus tightening the threaded connection 110. Also, because the number of threads per inch at the nut-multiplier threads 145 ($TPI_{nut-multiplier}$) is less than the number of threads per inch at the multiplier-box threads 155 ($TPI_{multiplier-box}$), the nut 130 actually tightens onto the multiplier 140 faster than the multiplier 140 threads off of the box-end pipe section 230.

One of ordinary skill in the art will readily appreciate that the torque tool 300 depicted and described above represents only one possible tool design that could be utilized to tighten the threaded connection 110. In fact, any tool capable of simultaneously engaging both the nut 130 and multiplier 140 and applying a force that causes the nut 130 and the multiplier 140 to rotate opposite each other may be used instead of torque tool 300 to tighten the threaded connection 110. The bores 190 of the nut 130 and the holes 180 of the multiplier 140 are provided purely for a mechanical means of leverage. As one of ordinary skill in the art will understand, this leverage may be applied mechanically, electrically, pneumatically, hydraulically or by another means.

In another embodiment of the threaded connector 100, the nut 130 may be replaced with a spline nut 600 as depicted in FIG. 6. Instead of the bores 190 in the flange 240 of the nut 130, as depicted in FIG. 2, the spline nut 600 comprises no flange 240 and includes splines 610 spaced about the circumference of the spline nut 600. The torque tool 300 of FIG. 3A and FIG. 3B could be modified to engage the splines 610 and rotate the spline nut 600 with respect to the multiplier 140 to tighten the threaded connection 110. One of ordinary skill in the art will readily appreciate that splines could also be provided along the multiplier 140 circumference, and the torque tool 300 could be modified to engage such splines when tightening the threaded connection 110.

Figure 3D:
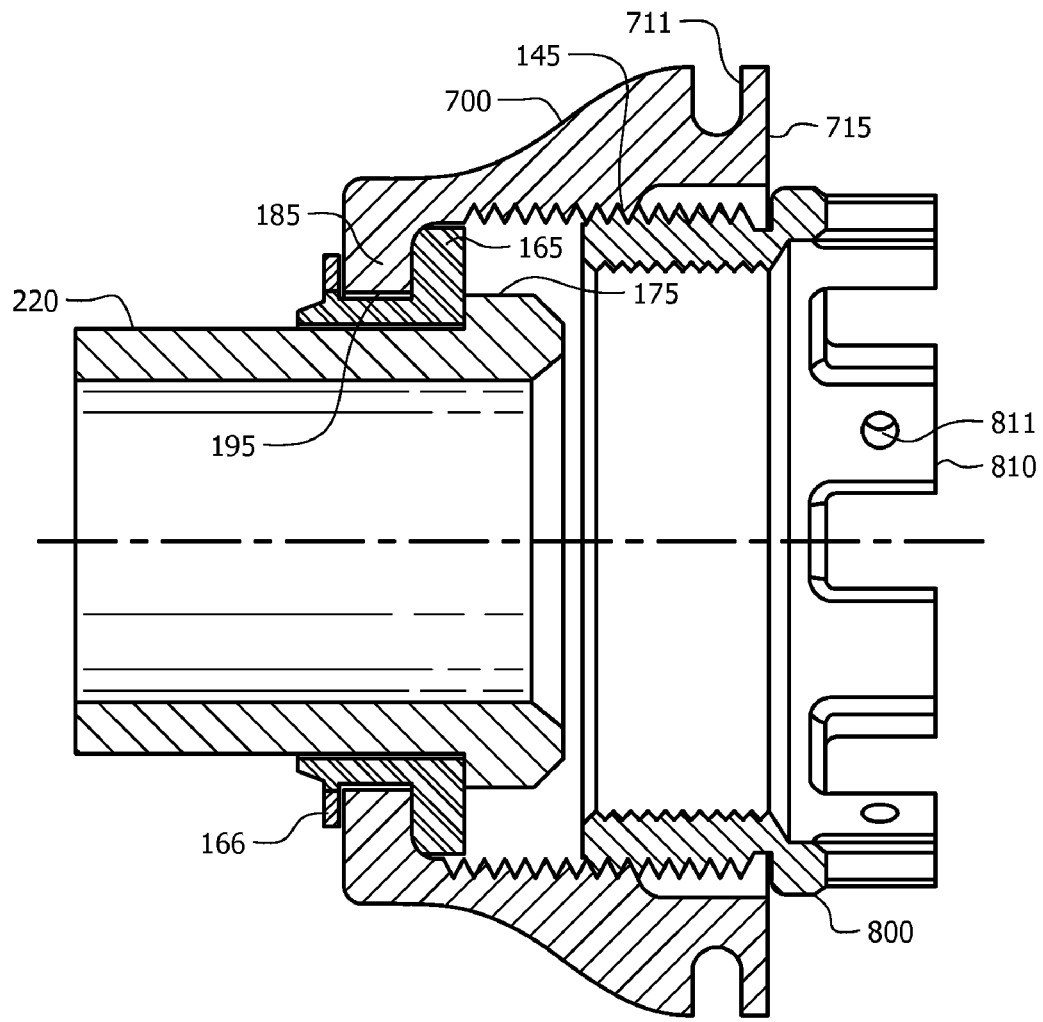
FIGS. 3D to 3F are sequential cross-sectional views of one embodiment of a make up sequence for the threaded connection depicted in FIGS. 7-9.
Figure 3E:
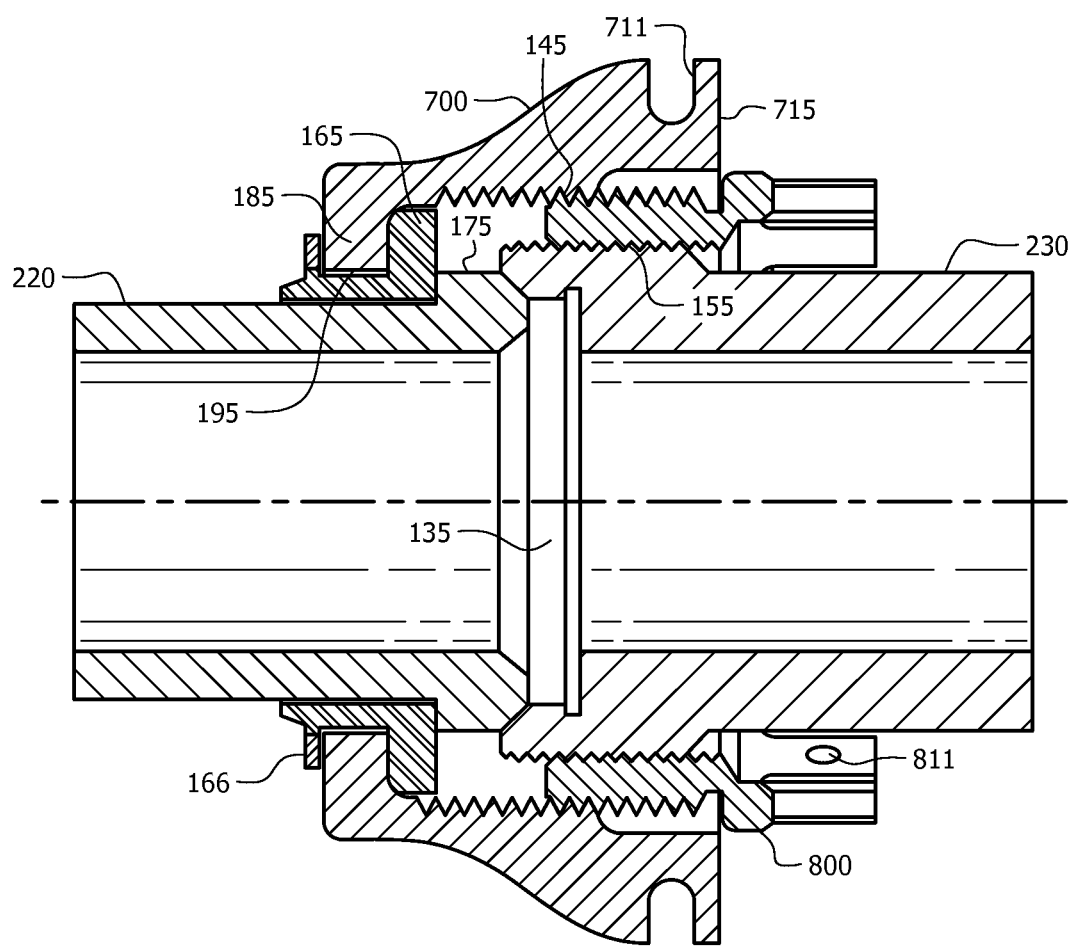
Figure 3F:
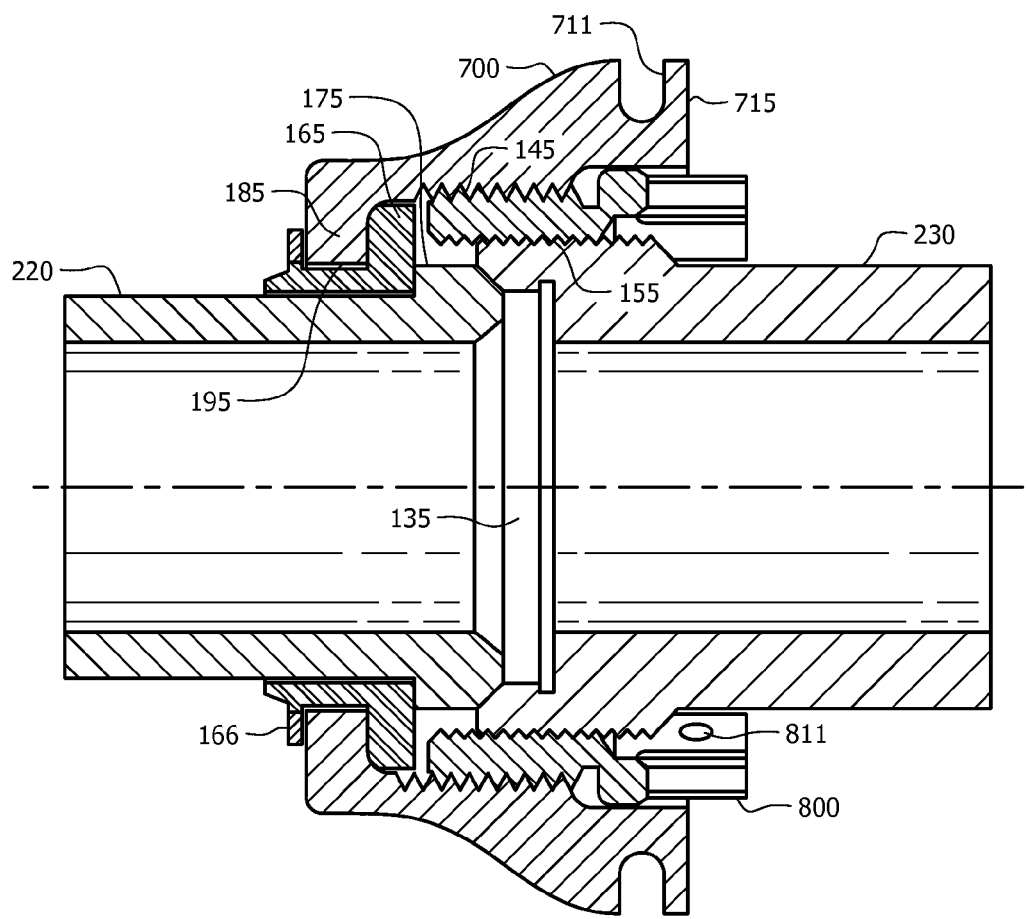
Figure 7B:
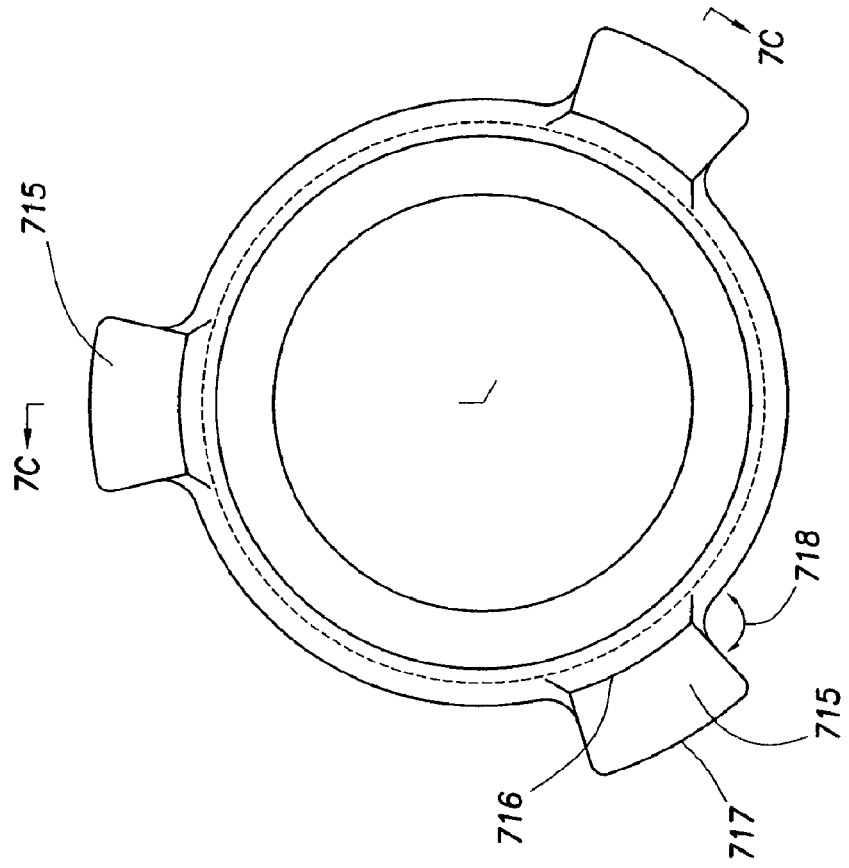
FIG. 7B is a front perspective view of a lug structure of an embodiment of one component of a threaded connector comprising a lug nut.
Figure 7A:
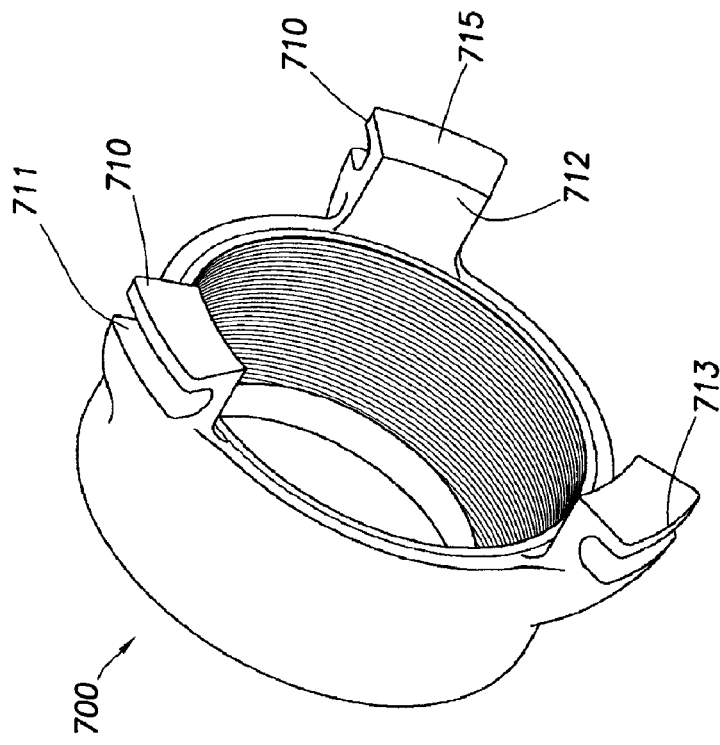
FIG. 7A is a side perspective view of another embodiment of one component of a threaded connector comprising a lug nut.
Figure 8:
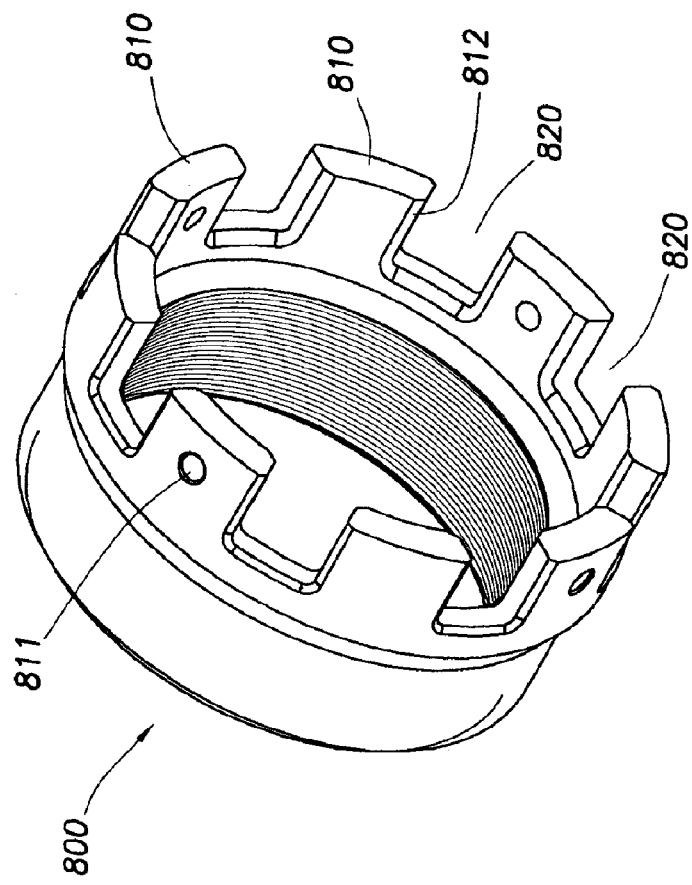
FIG. 8 is a side perspective view of another embodiment of one component of a threaded connector comprising a crenelated multiplier.
Figure 7C:
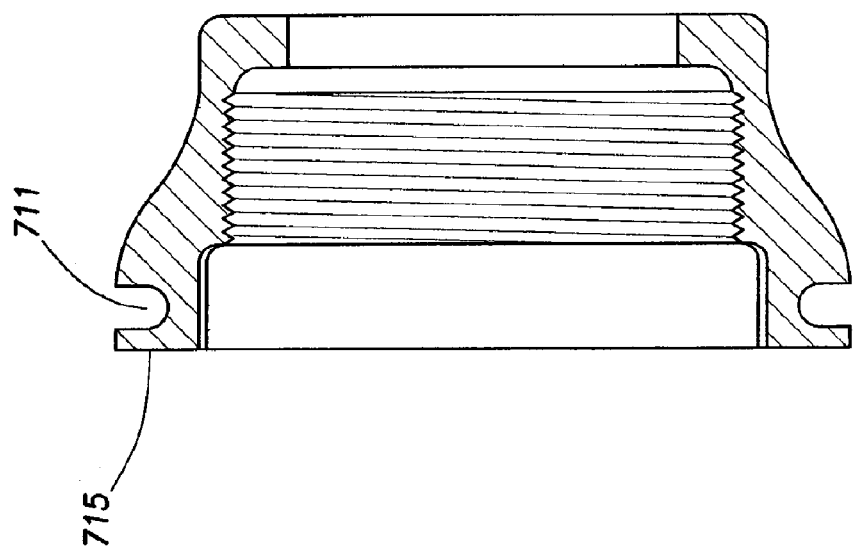
FIG. 7C is a cross-sectional view of a lug structure of an embodiment of one component of a threaded connection comprising a lug nut.

In another embodiment of the threaded connector 100 and depicted in FIGS. 3D-3F, the nut 130 may be replaced with a lug nut 700, as depicted in FIG. 7, and the multiplier 140 may be replaced with a crenelated multiplier 800, as depicted in FIG. 8. For purposes of this Application, crenelated shall include square, rectangular, polygonal, irregular, and curved areas defined by adjacent complimentary structures. Similar to the flange 240 of the nut 130, the lug nut 700 comprises at least one lug structure 710. Similar to the holes 180 of the multiplier 140, as depicted in FIG. 2, the crenelated multiplier includes at least two merlon structures 810 separated by a crenel-like space 820.

In an embodiment, the lug nut 700 comprises one lug. In another embodiment, the lug nut 700 comprises two lugs. In another embodiment, the lug nut 700 comprises three lugs. In another embodiment, the lug nut 700 comprises four lugs. In another embodiment, the lug nut 700 comprises a plurality of lugs.

Figure 9:
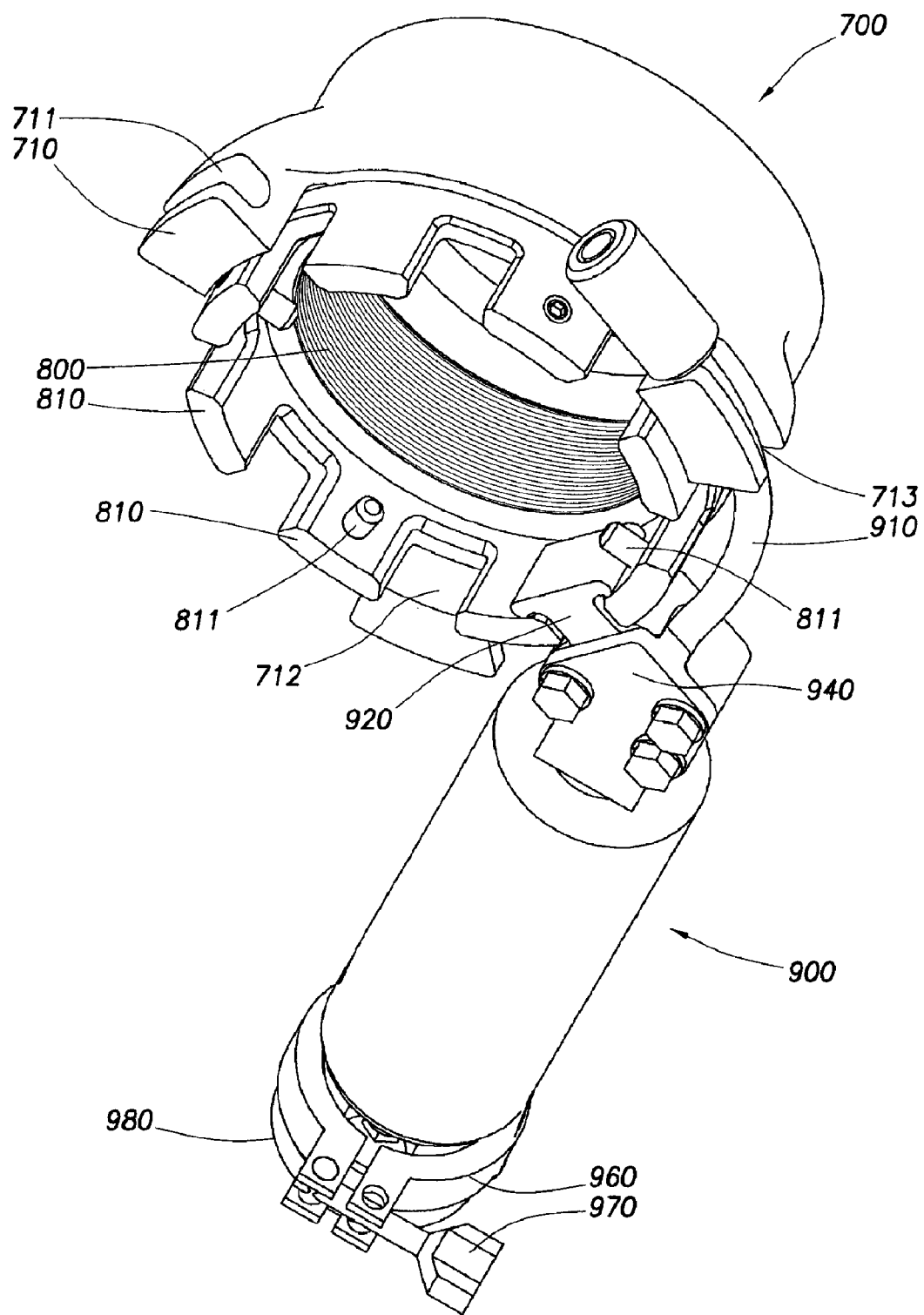
FIG. 9 is a front perspective view of the representative threaded connectors depicted in FIGS. 7 and 8 engaging to form a threaded connection and an embodiment of a torque tool used to make up the threaded connection.

The lug structure 710 allows for the interaction, engagement, and/or mating with a torque tool. The lug structure 710 may be slotted, channeled 711 or bored to interact with a torque tool akin to an embodiment of a hydraulic cylinder torque tool 900 depicted in FIG. 9. In one embodiment, the lug structure 710 is keystone shaped, as shown by cross section of front face 715. The keystone shape allows for a differential in the length of the slotted, channeled, or bored portion of the lug structure 710 between a portion 712 of the lug structure proximate to the narrow terminal edge of the lug structure 710 and a portion 713 of the lug structure 710 furthest from the narrow terminal edge of the lug structure 710. As shown in FIG. 7B, the differing lengths of the proximate 716 and distant portions 717 of the slotted, channeled 711, or bored lug form an angled structure 718. Angled structure 718 provides a secure engagement position on the lug structure 710 for the slotting, channeling, or traversing element 910 of a hydraulic cylinder torque tool 900, as depicted in FIG. 9. During make-up of the connection, angled structure 718 provides a plane of resistance force for engagement of the torque tool that is not parallel to the force applied by the torque tool during make-up of the connection.

In an embodiment, the crenelated multiplier 800 comprises two merlon structures 810 separated by two crenel-like spaces 820. In another embodiment, the crenelated multiplier 800 comprises three merlon structures 810 separated by three crenel-like spaces 820. In another embodiment, crenelated multiplier 800 comprises four merlon structures 810 separated by four crenel-like spaces 820. In another embodiment, crenelated multiplier 800 comprises five merlon structures 810 separated by five crenel-like spaces 820. In another embodiment, the crenelated multiplier 800 comprises a plurality of merlon structures 810 separated by a plurality of crenel-like spaces 820.

The merlon structures 810 of the crenelated multiplier 800 may be fashioned with holes 811 to accept various friction increasing components, e.g. set screws. The friction increasing components may be used to contact the box-end pipe section 230 to resist low amounts of torque on the crenelated multiplier 800 allowing for more efficient mating of the pipe end sections.

The crenelated multiplier 800 allows for the interaction, engagement, and/or mating with a torque tool. In one embodiment, the crenel-like space 820 between the merlon structures 810 is specifically configured to accept the engagement of the guide 920 of the hydraulic cylinder torque tool 900 or the engagement of component 1110 of the hydraulic cylinder torque tool 1100. Moreover, the edges of the crenel-like space 820, as defined by the merlon structures 810, may be rectangular and/or beveled 812 to promote secure interaction, engagement and or mating with a correspondingly configured structure of the torque tool.

Figure 10B:
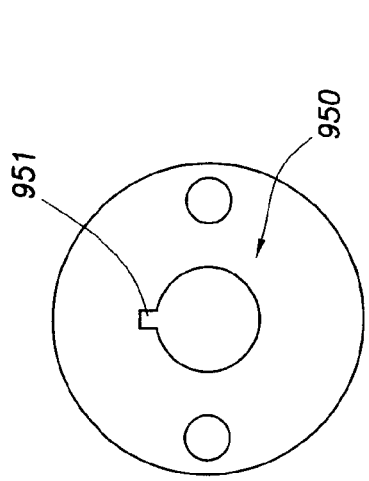
FIG. 10B is a front perspective view of an embodiment of the retainer hub of the torque tool depicted in FIGS. 9, 10A, 10D, and 11.
Figure 10C:
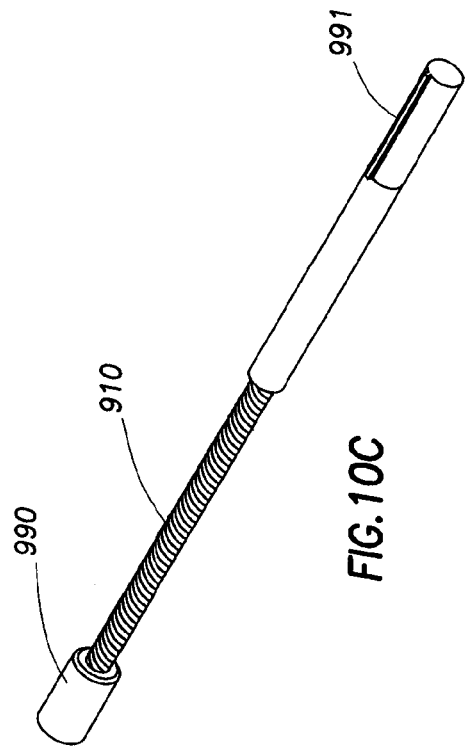
FIG. 10C is a side perspective view of an embodiment of the wire rope that may be used in the torque tool depicted in FIGS. 9 and 10A.
Figure 10A:
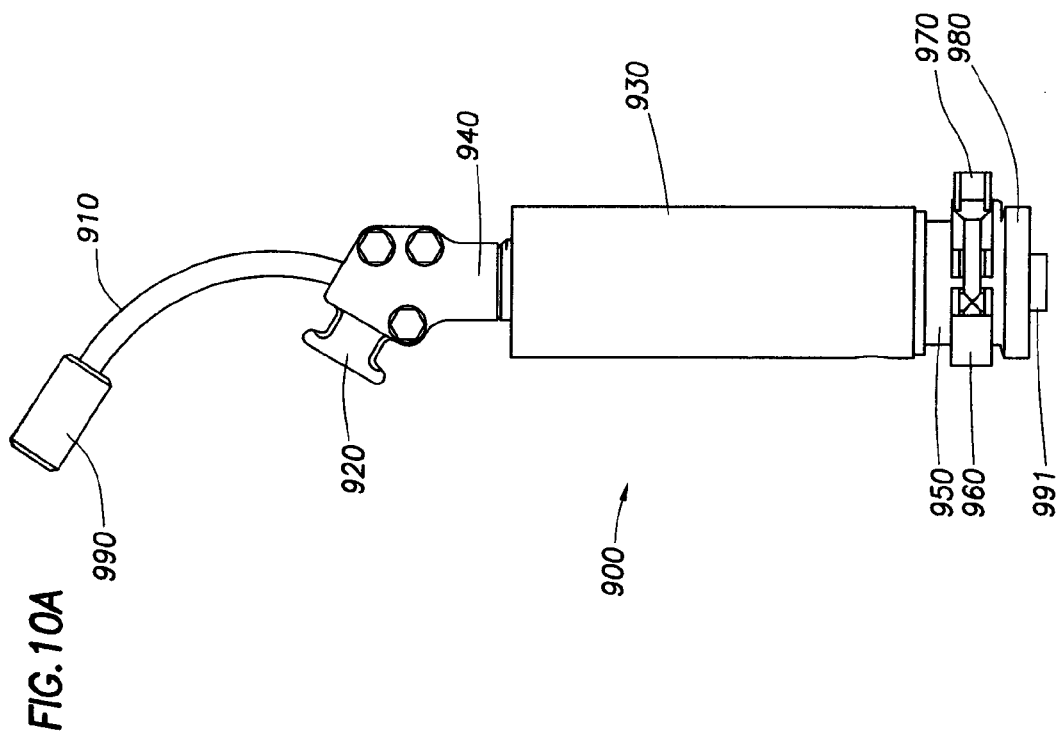
FIG. 10A is a side perspective view of an embodiment of a torque tool that may be used to make up the threaded connection depicted in FIG. 9.

The hydraulic cylinder torque tool 900 is used to apply opposite rotational forces on the lug nut 700 and the crenelated multiplier 800 for tightening a connection absent the application of impact force. FIGS. 10A, 10B, and 10C depict a representative embodiment of the hydraulic cylinder torque tool 900, and certain components, that may be used to make up the threaded connection 110 having a negative $TPI_{EQ}$ between the nut 130 and the box-end pipe section 230. The hydraulic cylinder torque tool 900 comprises a hollow bore hydraulic cylinder 930, a flexible force distributing component, e.g. wire rope 910; a guide 920, a guide cap 940, a retainer hub 950, a clamp 960 with thumbscrew 970, and a threaded slack adjuster 980.

In one embodiment, as depicted in FIG. 9, the wire rope 910 passes through the hollow bore hydraulic cylinder 930, through a cavity between the guide 920 and the guide cap 940, and engages the lug structure 710 of lug nut 700. The wire rope 910, which may comprise metal wires, composite fibers, or any combination thereof, is configured to occupy the channel 711 of the lug structure 710 of lug nut 700. The terminal end of the wire rope 910 proximate to the channel 711 is swaged with a button-like component 990, the diameter of which is greater that the diameter of the channel 711. The other terminal end of wire rope 910 is swaged, threaded and configured to form a keyway 991. The keyway terminal end of the wire rope 910 transverses the hollow bore hydraulic cylinder 930, the retainer hub 950, which is fashioned to receive the keyway terminal end of the wire rope 991 in shaped opening 951, the clamp 960, and the threaded slack adjuster 980. The threaded slack adjuster 980 is secured to the retainer hub 950 by the clamp 960. The circumference of the clamp 960, which relates to the securing force applied by the clamp 960 to the retainer hub 950 and the threaded slack adjuster 980, is adjusted by rotating the thumbscrew 970.

The length of the wire rope 910 available for engaging the lug nut 700 can be altered by rotating the threaded slack adjuster 980 through which passes the threaded end of the keyway portion 991 of the wire rope 910. The cross-section of the keyway 991 corresponds to the cross-section of shaped opening 951. for example, a singular radial plane opening such as a square or rectangular notch. The interaction of the keyway 991 and the shaped opening 951 of the retainer hub 950 prevents the wire rope 910 from rotating on its radial axis.

As shown in FIG. 9, the guide 920 engages the crenel-like space 820 of the crenelated multiplier 800. As illustrated in FIGS. 8, 9, and 10A and as previously detailed, the edges of the crenel-like space 820, as defined by the merlon structures 810, may be rectangular and/or beveled 812 to promote secure interaction, engagement and or mating with a correspondingly configured structure, e.g., guide 920 of the hydraulic cylinder torque tool.

Figure 10D:
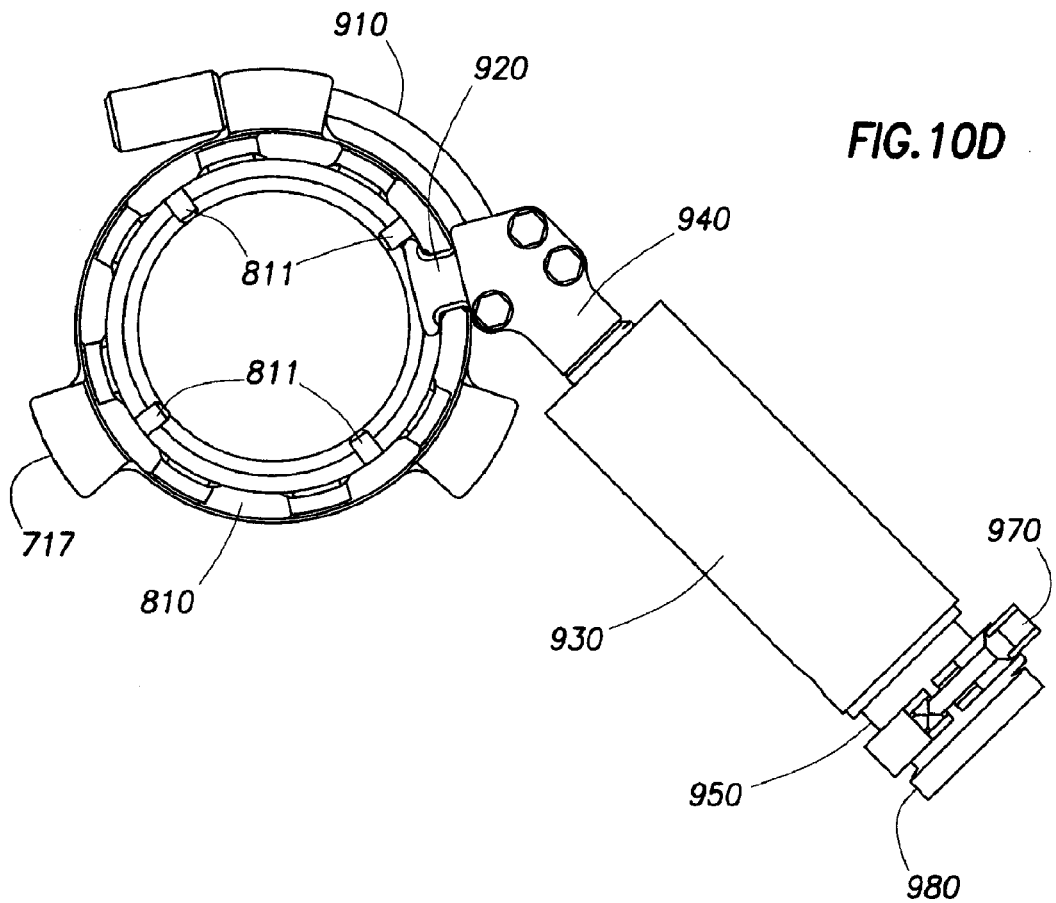
FIG. 10D is a side perspective view of the representative threaded connectors depicted in FIGS. 7 and 8 engaging to form a threaded connection and an embodiment of a torque tool used to make up the threaded connection.
Figure 10E:
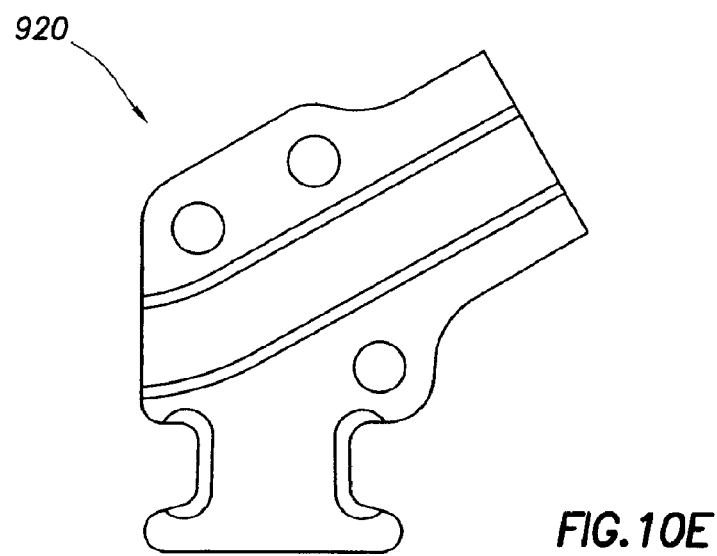
FIG. 10E is a side perspective view of an embodiment of the guide of the hydraulic cylinder torque tool depicted in FIGS. 9, 10A, and 10D.

As depicted in FIGS. 9 and 10D, for leverage: (1) the piston (not shown) of the hydraulic cylinder torque tool 900 shoulders the guide 920 which is engaged in the crenel-like space 820 between the merlon structures 810 on the crenelated multiplier 800; and (2) the button-like component 990 contacts the sides of lug structure 710 along a plane provided by angled structure 718, as shown in FIG. 7B.

To make up the threaded connection 110, the lug nut 700 slides over the pin-end pipe section 220 and the dogs 165 are positioned to engage a shoulder 175 on the pin-end pipe section 220. An annular ring portion 185 of the lug nut 700 engages an annular recess 195 formed into the dogs 165. In one embodiment, the dogs 165 comprise a plurality of partial circular segments that fit together to form a complete circle. Then a retaining ring 166 is installed that surrounds the dogs 165 to hold them together in position about the pin-end pipe section 220. Next, the crenelated multiplier 800 is hand threaded into the lug nut 700 while the lug nut 700 is held in place, leaving some room for further engagement, as is similarly depicted in FIG. 3A. As the crenelated multiplier 800 is threaded into the lug nut 700 via the nut-multiplier threads 145, the lug nut 700 is prevented from moving axially, but not rotationally, via the retaining ring 166 and the dogs 165 engaging the shoulder 175 of the pin-end pipe section 220. In particular, the lug nut 700 is constrained from moving axially by the engagement of the annular ring portion 185 of the lug nut 700 within the annular recess 195 of the dogs 165 and the retaining ring 166. The crenelated multiplier may also be prevented from moving rotationally by configuring the crenelated multiplier 800 to accept friction increasing components, e.g. set screws, to apply anti-rotational frictional forces to the box-end pipe section 230.

To tighten the threaded connection 110, the hydraulic cylinder torque tool 900 is utilized. Specifically, the piston of the hydraulic cylinder torque tool 900 is actuated. Actuation of the piston may be accomplished mechanically, electrically, pneumatically, or by any another means. As the piston extends, the wire rope 910 is pulled through an arc and through the body of the hollow bore cylinder 930 to tighten the pipe connection. The extension of the hydraulic torque tool's 900 piston causes the lug nut 700 and the crenelated multiplier 800 to rotate in opposite directions, thus tightening the threaded connection 110.

Figure 11:
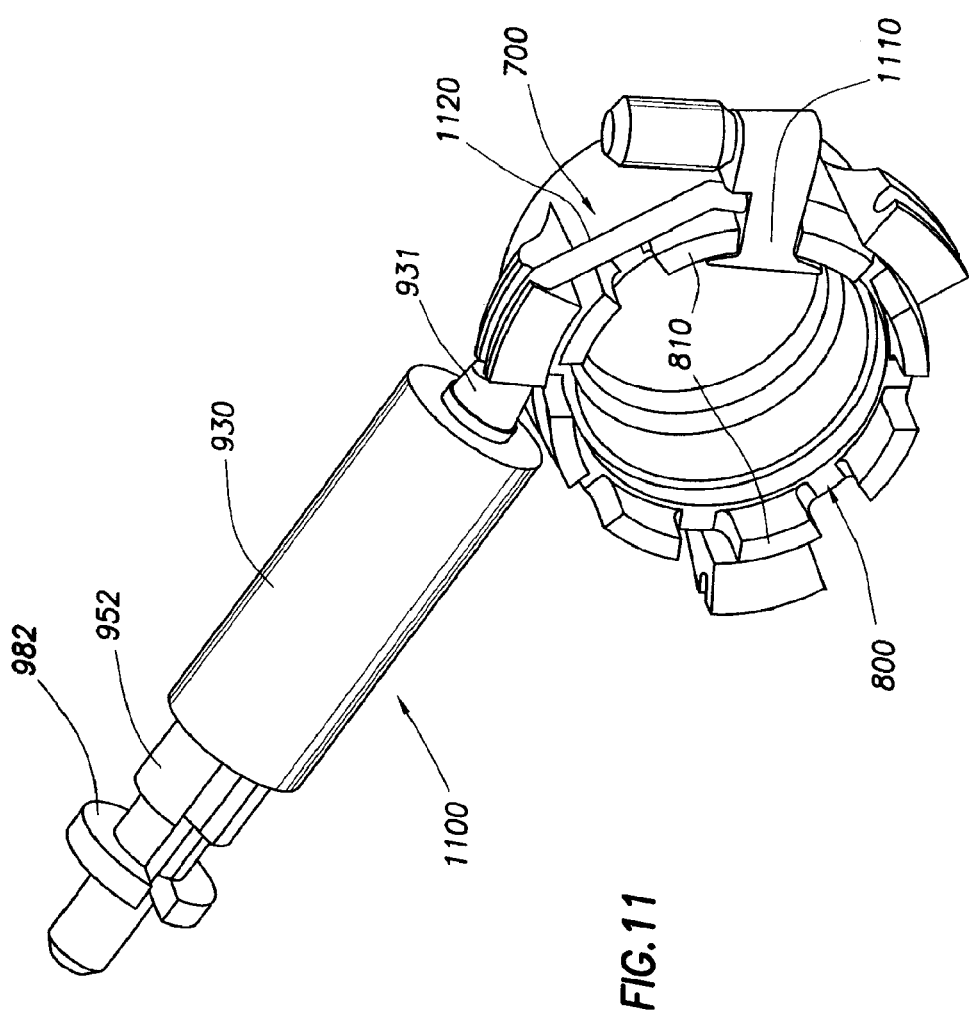
FIG. 11 is a side perspective view of another embodiment of a torque tool that may be used to make up the threaded connection depicted in FIG. 9.

Another embodiment of a torque tool utilized for tightening the threaded connection is depicted in FIG. 11. The embodiment depicted in FIG. 11 comprises several components of the hydraulic cylinder tool 900 depicted in FIGS. 9 and 10. Hydraulic cylinder torque tool 1100 comprises a hollow bore hydraulic cylinder 930, a flexible force distributing component 1120, a retainer hub 950, which is fashioned to receive the keyway terminal end of the flexible force distributing component 1120 in shaped opening 951, the clamp 960, and a slack adjuster 982. The slack adjuster 982 is secured to the retainer hub 952 by the clamp 960.

Affixed to the terminal end of the flexible force distributing component 1120 proximate to the merlon structures 810 is an engagement component 1110 designed to engage the crenel-like space 820 between the merlon structures 810 of the crenlated multiplier 800. The terminal end of the flexible force distributing component 1120, proximate to the retainer hub 950, is swaged, threaded and configured to form a keyway 991. The keyway terminal end of the wire rope 910 transverses the hollow bore hydraulic cylinder 930, the retainer hub 950, and the slack adjuster 980. The interaction of the keyway 991 and the retainer hub 950 prevents the wire rope 910 from rotating on its radial axis, as described previously.

For leverage: (1) the nose 931 of the hydraulic cylinder torque tool 1100 shoulders the lug structure 710; and (2) the engagement component 1110 that engages the crenel-like space 820 shoulders the adjacent merlon structures 810.

As depicted in FIG. 11, the flexible force distributing component 1120 traverses the channel 711 of the lug structure 710 and enters the nose 931 of the hydraulic cylinder torque tool 1100. To tighten the threaded connection 110, the piston of the hydraulic cylinder torque tool 1100 is actuated. Actuation of the piston may be accomplished mechanically, electrically, pneumatically, or by any another means. As the piston extends, the flexible force distributing component 1120 is pulled through an arc and through the body of the hollow bore cylinder 930. The lug structure 710 and the crenel-like space 820 of the crenelated multiplier rotate towards each other to tighten the pipe connection.

The foregoing descriptions of specific embodiments of threaded connectors 100 comprising a nut 130, 600, 700 and a multiplier 140, 800 and methods for making up threaded connections 110 between two pipe sections 220, 230 using such threaded connectors 100, have been presented for purposes of illustration and description and are not intended to be exhaustive or to limit the invention to the precise forms disclosed. Obviously many other modifications and variations of these embodiments are possible. In particular, the specific number of threads per inch at the nut-multiplier threads 145 (TPI$_{nut\text{-}multiplier}$) and/or the number of threads per inch at the multiplier-box threads 155 (TPI$_{multiplier\text{-}box}$) could be modified to permit quicker assemblage of the threaded connection 110. Also, the nut 130 and the multiplier 140 could be modified to utilize design features other than bores 180, holes 190 or splines 610, as depicted in FIG. 2 and FIG. 6. Regardless of the chosen design feature, whether bores 180, holes 190, splines 610, lug structures 710, merlon structures 810, crenel-like spaces 820, or something else, such features would permit a tool to simultaneously engage both the nut 130, 600, 700 and the multiplier 140, 800 to tighten the threaded connection 110. For example, a tool could simultaneously engage a hole in the nut and a crenel-like space on the multiplier; a spline on the nut and a crenel-like space on the multiplier; a lug on the nut and a hole on the multiplier; or a lug on the nut and a spline on the multiplier.

One of ordinary skill in the art will readily appreciate that the torque tools 300, 900, and 1100 depicted and described above represent only three possible tool designs that could be utilized to tighten the threaded connection 110. In fact, any tool capable of simultaneously engaging both a nut 130, 600, 700 and a multiplier 140, 800 and applying a force that causes a nut 130, 600, 700 and a multiplier 140, 800 to rotate opposite each other may be used instead of torque tools 300, 900 and 110 to tighten the threaded connection 110. The bores 190 of nut 130, the splines 610 of nut 600, the lug structures 710 of nut 700, the holes 180 of the multiplier 140, and the merlon structures 810 and crenel-like space 820 of the crenelated multiplier 800 are provided purely for a mechanical means of leverage.

As one of ordinary skill in the art will understand, this leverage may be applied mechanically, electrically, pneumatically, hydraulically or by another means.

Moreover, other design features, besides bores 180, holes 190, splines 610, lug structures 710, merlon structures 810, and crenel-like spaces 820 could be utilized to allow a torque tool to simultaneously engage both a nut 130, 600, 700 and a multiplier 140, 800 of the threaded connector 100 to tighten the threaded connection 110.

While several embodiments of threaded connectors 100 and methods for making up threaded connections 110 have been shown and described herein, modifications may be made by one skilled in the art without departing from the spirit and the teachings of the invention. The embodiments described are representative only, and are not intended to be limiting. Many variations, combinations, and modifications of the applications disclosed herein are possible and are within the scope of the invention. Accordingly, the scope of protection is not limited by the description set out above, but is defined by the claims which follow, that scope including all equivalents of the subject matter of the claims.

What we claim as our invention is:
1. A threaded connection assembly comprising:
   a nut;
   a multiplier connected to the nut via a first threaded interface having a first number of threads per inch (first TPI); and
   a well servicing pipe coupling connected to the multiplier via a second threaded interface having a second number of threads per inch (second TPI);
   wherein the nut is a lug nut, the multiplier is crenelated, or both;
   wherein a value of the first TPI is different than a value of the second TPI; and
   wherein the well servicing pipe coupling comprises two pipe sections that engage to provide a seal.

2. The threaded connection assembly of claim 1 wherein the first TPI is less than the second TPI.

3. The threaded connection assembly of claim 1 wherein an equivalent TPI between the nut and the well servicing pipe coupling is negative and wherein the equivalent TPI is calculated by dividing the product of the first TPI times the second TPI by the difference of the first TPI minus the second TPI.

4. The threaded connection assembly of claim 1 wherein the first threaded interface and the second threaded interface are at least partially formed simultaneously.

5. The threaded connection assembly of claim 1 wherein the nut connects to the well servicing pipe coupling via a non-threaded connection.

6. The threaded connection assembly of claim 1 wherein the nut and the multiplier rotate in opposite directions to form the second threaded interface.

7. The threaded connection assembly of claim 1 wherein the crenelated multiplier comprises a plurality of crenel-like spaces.

8. The threaded connection assembly of claim 1 wherein the crenelated multiplier comprises friction increasing components to engage the well servicing pipe.

9. The threaded connection assembly of claim 8 wherein the friction increasing components comprise screws, bolts, pins, or any combination thereof.

10. The threaded connection assembly of claim 1 wherein the lug nut comprises a plurality of lugs.

11. The threaded connection assembly of claim 1 wherein the lug nut comprises at least one lug comprising a keystone shape.

12. The threaded connection assembly of claim 1 wherein the lug nut comprises at least one lug comprising a slot, channel, or bore.

* * * * *